United States Patent
Jibu et al.

(10) Patent No.: US 8,345,353 B2
(45) Date of Patent: Jan. 1, 2013

(54) LONG-LENGTH LENS

(75) Inventors: Yasuomi Jibu, Ichinomiya (JP); Yasuhiro Ideno, Seto (JP); Junji Fujitani, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 82 days.

(21) Appl. No.: 13/072,759

(22) Filed: Mar. 27, 2011

(65) Prior Publication Data
US 2011/0242674 A1    Oct. 6, 2011

(30) Foreign Application Priority Data
Mar. 31, 2010  (JP) .................................. 2010-081914

(51) Int. Cl.
*G02B 3/00* (2006.01)
(52) U.S. Cl. ........................................ 359/642; 359/662
(58) Field of Classification Search .................. 359/642, 359/662, 725
See application file for complete search history.

(56) References Cited

U.S. PATENT DOCUMENTS
2010/0054809 A1 *  3/2010  Takahashi et al. ............ 399/151

FOREIGN PATENT DOCUMENTS
| JP | 2000-056246 A | 2/2000 |
| JP | 2001-219447 A | 8/2001 |
| JP | 2001-311896 A | 11/2001 |
| JP | 2002-267807 A | 9/2002 |
| JP | 2002-357701 A | 12/2002 |
| JP | 2002-365576 A | 12/2002 |
| JP | 2004-091239 A | 3/2004 |
| JP | 2007-039262 A | 2/2007 |
| JP | 2008-119830 A | 5/2008 |
| JP | 2008-224814 A | 9/2008 |
| JP | 2009-047896 A | 3/2009 |
| JP | 2009-184241 A | 8/2009 |

OTHER PUBLICATIONS

Japan Patent Office, Decision of Grant for Patent for Japanese Patent Application No. 2010-081914 (counterpart Japanese patent application) mailed Aug. 21, 2012.

* cited by examiner

*Primary Examiner* — Darryl J Collins
(74) *Attorney, Agent, or Firm* — Baker Botts L.L.P.

(57) ABSTRACT

A lens including a lens portion having first and second opposite oblong surfaces is disclosed. At least one of the first and second oblong surfaces of the lens portion is a curved lens surface having a reflective power. A rib portion is disposed at each of two opposite sides of the lens portion facing in a direction of a width of the first oblong surface. The rib portion extends along a longitudinal direction of the lens portion in a position separate from the second oblong surface. A draft surface extends between the second oblong surface and the rib portion. The draft surface includes a slant surface slanting outwardly toward the rib portion. The slant surface is curved inwardly with a draft thereof increasing gradually toward the rib portion.

4 Claims, 5 Drawing Sheets

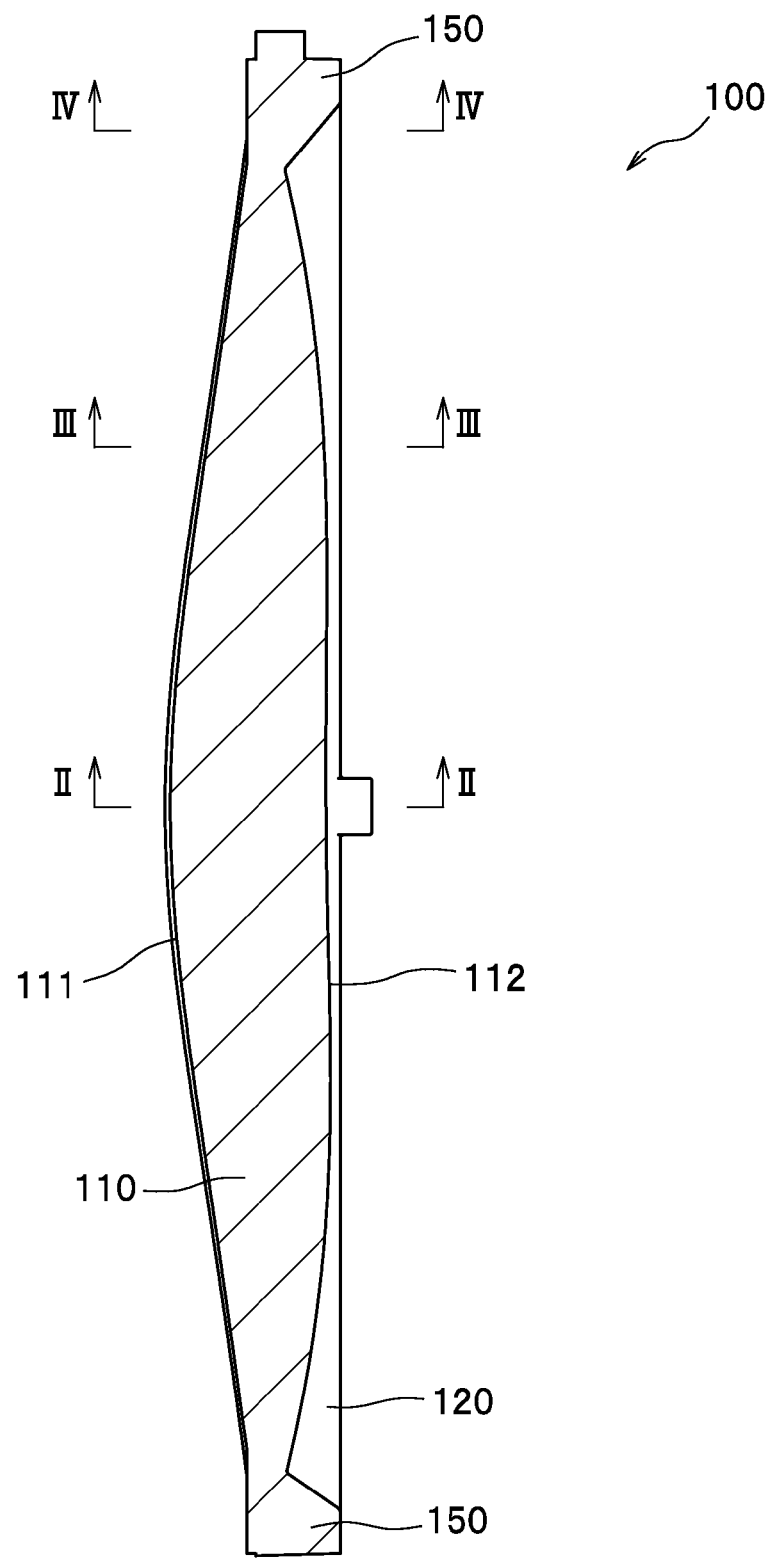

LONG-LENGTH LENS

CROSS-REFERENCE TO RELATED APPLICATION(S)

This application claims priority from Japanese Patent Application No. 2010-081914 filed on Mar. 31, 2010, the disclosure of which is incorporated herein by reference in its entirety.

FIELD

The present invention relates to a long-length lens.

BACKGROUND

A lens including a lens portion having two opposite oblong lens surfaces is known in the art. This lens may be formed by injecting or pouring into a mold a molten resin material which is then let cooled and solidified.

In order to smoothly remove a molded lens from a mold, two opposite oblong sides of the lens portion disposed adjacent to the longer sides of the oblong lens surfaces may be provided with flatly shaped draft surfaces which slant outwardly from one lens surface toward another at a predetermined angle. However, such a flatly shaped draft surface is formed with triangular prismatic portions added at those oblong sides of the lens portion, thus increasing the volume of the lens. The increase of the volume of the lens would require a longer period of time for injection, cooling, etc. during manufacture of the lens, and entail the disadvantages of increased manufacturing time.

There is a need to provide a lens with an advantage in shortened manufacturing time.

SUMMARY

In one aspect of the present invention, there is provided a lens which comprises a lens portion, a rib portion, and a draft surface. The lens portion has first and second opposite oblong surfaces, at least one of which is a curved lens surface having a refractive power. The rib portion is disposed at each of two opposite sides of the lens portion facing in a direction of a width of the first oblong surface, and extends along a longitudinal direction of the lens portion in a position separate from the second oblong surface. The draft surface extends between the second oblong surface and the rib portion and includes a slant surface slanting outwardly toward the rib portion. The slant surface of the draft surface is curved inwardly with a draft thereof increasing gradually toward the rib portion.

BRIEF DESCRIPTION OF THE DRAWINGS

The above aspect, its advantages and further features of the present invention will become more apparent by describing in detail illustrative, non-limiting embodiments thereof with reference to the accompanying drawings, in which:

FIG. 3 is a sectional view taken along line I-I of FIG. 2;

DESCRIPTION OF EMBODIMENTS

A detailed description will be given of an illustrative embodiment of the present invention with reference made to the drawings where appropriate. In the following description, a general setup of an image forming apparatus in which an optical scanner including a lens according to the present embodiment is provided will be described at the outset, and then structural features of the lens will be described in detail.

<General Setup of Laser Printer>

Figure 1:
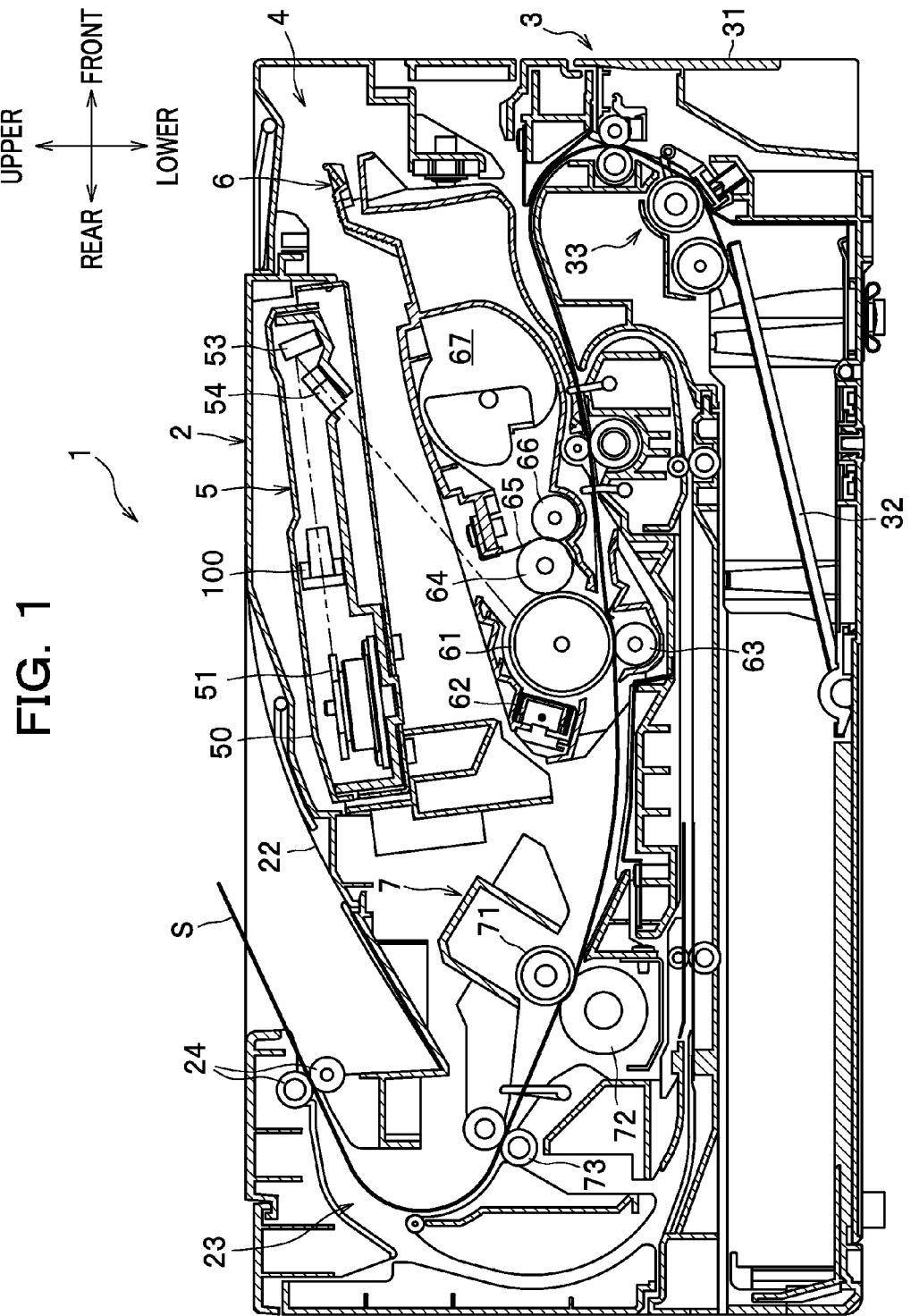
FIG. 1 is a schematic diagram of a laser printer which includes an fθ lens as one example of a lens according to an illustrative embodiment.

As shown in FIG. 1, a laser printer 1 (image forming apparatus) comprises a body casing 2, and several components housed within the body casing 2 which principally include a sheet feeder unit 3 for feeding a sheet S (e.g., of paper), and an image forming unit 4 for forming an image on the sheet S.

Hereinbelow, in describing the arrangement and operation of each component in the laser printer 1, the direction is designated as from the viewpoint of a user who is using (operating) the laser printer 1. To be more specific, in FIG. 1, the right-hand side of the drawing sheet corresponds to the "front" side of the printer, the left-hand side of the drawing sheet corresponds to the "rear" side of the printer, the front side of the drawing sheet corresponds to the "left" side of the printer, and the back side of the drawing sheet corresponds to the "right" side of the printer. Similarly, the direction of a line extending from top to bottom of the drawing sheet corresponds to the "vertical" or "up/down (upper/lower or top/bottom)" direction of the printer.

The sheet feeder unit 3 is disposed in a lower space inside the body casing 2, and principally includes a sheet feed tray 31, a sheet pressure plate 32 and a sheet conveyor mechanism 33. In the sheet feeder unit 3, sheets S in the sheet feed tray 31 are pressed upwardly by the sheet pressure plate 32, and each sheet S separated from the others is conveyed by the sheet conveyor mechanism 33 into the image forming unit 4.

The image forming unit 4 principally includes an optical scanner 5, a process cartridge 6, and a fixing unit 7.

The optical scanner 5 is disposed in an upper space inside the body casing 2, and comprises a substantially boxlike housing 50, and several components housed within the housing 50 which principally include a laser light source (not shown), a polygon mirror 51, an fθ lens 100 as one example of a lens, a reflecting mirror 53, and a cylindrical lens 54.

The polygon mirror 51 is shaped generally like a hexagonal column with six sides consisting of reflecting surfaces. The polygon mirror 51 spins at high speed and reflects a laser beam (see alternate long and short dashed lines) from the laser light source to cause the laser beam to change its direction along the main scanning direction so that the laser beam sweeps with constant angular velocity.

The fθ lens 100 is a scan lens through which the laser beam caused to change its direction and sweep by the polygon mirror 51 travels. In the fθ lens 100, the laser beam caused to sweep with constant angular velocity by the polygon mirror 51 is converted into a laser beam which sweeps with constant linear velocity. A detailed description of the fθ lens 100 will be given later.

The reflecting mirror 53 is configured to reflect the laser beam which has passed through the fθ lens 100 so that the laser beam is turned back toward the cylindrical lens 54.

The cylindrical lens 54 is a scan lens through which the laser beam reflected off the reflecting mirror 53 travels. In the cylindrical lens 54, the laser beam is refracted and converged in the sub-scanning direction.

In this optical scanner 5, a laser beam regulated according to image data and emitted from the laser light source reflects off or passes through the components, i.e., polygon mirror 51, fθ lens 100, reflecting mirror 53 and cylindrical lens 54, in this order, so that a peripheral surface of the photoconductor drum 61 is rapidly scanned (illuminated) with the laser beam.

The process cartridge 6 is disposed under the optical scanner 5, and configured to be installable in and removable from the body casing 2 through an opening which is formed when a front cover (not designated by reference numeral) provided at the body casing 2 is swung open. The process cartridge 6 principally includes a photoconductor drum 61, a charger 62, a transfer roller 63, a developing roller 64, a doctor blade 65, a supply roller 66, and a toner reservoir 67 for storing toner (developer).

In the process cartridge 6, the peripheral surface of the photoconductor drum 61 is uniformly charged by the charger 62, and then exposed to a rapidly sweeping laser beam from the optical scanner 5, so that an electrostatic latent image corresponding to the image data is formed on the peripheral surface of the photoconductor drum 61. Toner in the toner reservoir 67 is supplied via the supply roller 66 onto the developing roller 64, and passes through between the developing roller 64 and the doctor blade 65, so that a thin layer of toner having a predetermined thickness is carried on the developing roller 64.

The toner carried on the developing roller 64 is supplied from the developing roller 64 to the electrostatic latent image formed on the peripheral surface of the photoconductor drum 61. In this way, the electrostatic latent image is visualized and a toner image is formed on the peripheral surface of the photoconductor drum 61. Thereafter, a sheet S is conveyed through between the photoconductor drum 61 and the transfer roller 63, so that the toner image carried on the photoconductor drum 61 is transferred onto the sheet S.

The fixing unit 7 is disposed rearwardly of the process cartridge 6, and principally includes a heating roller 71 and a pressure roller 72 disposed opposite to the heating roller 71 to be pressed against the heating roller 71. In the fixing unit 7, the toner image transferred on the sheet S is thermally fixed on the sheet S while passing through between the heating roller 71 and the pressure roller 72. The sheet S with the toner image thermally fixed thereon is conveyed by conveyor rollers 73 along a sheet conveyor path 23 and ejected out from the sheet conveyor path 23 onto a sheet output tray 22 by output rollers 24.

<Detailed Structure of fθ Lens>

Next, a detailed structure of the fθ lens 100 will be described hereafter.

The fθ lens 100 in this embodiment is formed through a process comprising the steps of injecting a molten resin material into a mold having a cavity contoured to correspond to its specific shape, and letting the resin material solidified. The method for forming a lens configured in accordance with the present invention is not limited to a specific process, but typically includes the step of injecting a molten material, such as resin or glass, into a mold having a cavity contoured to correspond to the shape of the lens configured in accordance with the present invention.

Figure 2:
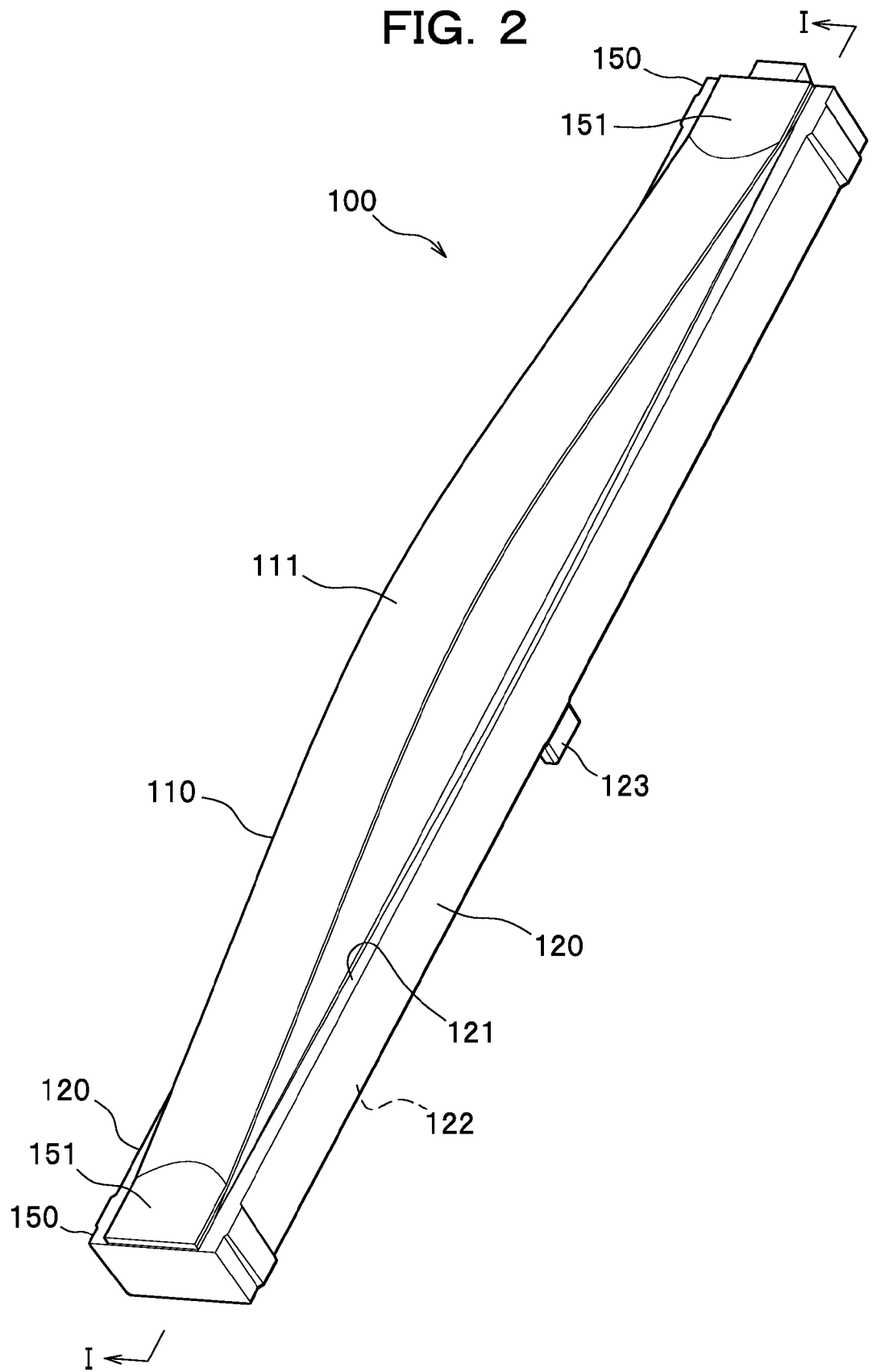
FIG. 2 is a perspective view of the fθ lens.

As shown in FIG. 2, the fθ lens 100 includes a lens portion 110, a pair of rib portions 120 and a pair of flange portions 150. The lens portion 110 has two opposite oblong lens surfaces 111, 112 (see also FIG. 3) each having a refractive power such that a laser beam passing through these lens surfaces 111, 112 of the lens portion 110 is refracted. Each of these oblong lens surfaces 111, 112 of the lens portion 110 is shaped generally like a rectangle having two opposite longer sides (extending in a direction of its length) and two opposite shorter sides (extending in a direction of its width) as viewed from an optical axis direction. The rib portions 120 are provided to protrude outward from two opposite sides of the lens portion 110 which face in the direction of the width of the oblong lens surface 112 (first oblong surface). The flange portions 150 are provided at both ends (two opposite sides which face in the direction of the length) of the lens portion 110 which extend between the corresponding shorter sides of the oblong lens surface 111, 112.

The fθ lens 100 arranged in the optical scanner 5 is oriented such that a direction of the lengths of the oblong lens surfaces 111, 112 (or direction of the length of the lens portion 110) is aligned with the main scanning direction in which the laser beam is caused to sweep. The direction perpendicular to the direction of the lengths of the oblong lens surfaces 111, 112 and perpendicular to the optical axis direction is herein referred to as a direction of the widths of the oblong lens surfaces 111, 112. The direction of the length of the lens portion 110 will be referred as "longitudinal direction" of the lens portion 110.

As best seen in FIG. 3, each of the oblong lens surfaces 111, 112 of the lens portion 110 is configured to be a convex surface that curves outward along the length with a portion closer to a center in the direction of the length of each oblong lens surface 111, 112 between two opposite shorter sides thereof being located farther toward outside than portions closer to the shorter sides (both ends facing outward in the direction of the length) of the oblong lens surface 111, 112.

Figure 4A:
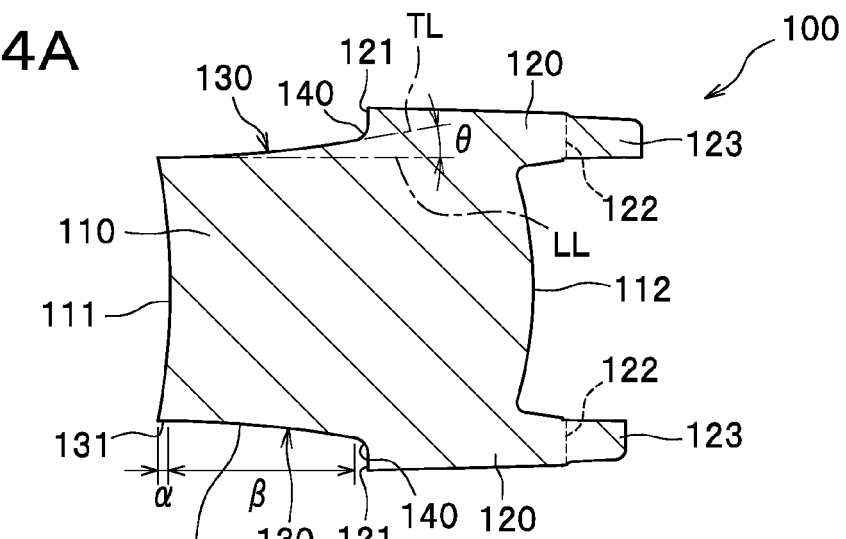
FIG. 4A is a sectional view taken along line II-II of FIG. 3.

As best seen in FIG. 4A, the oblong lens surface 111 which is the surface facing to the front in the optical axis direction (i.e., located at the foreside from which a laser beam traveling through the lens portion 110 goes out) is further configured to be a concave surface as viewed in cross section (taken along each plane perpendicular to the longitudinal direction of the lens portion 110) that curves inward with a portion closer to a center in the direction of the width of the oblong lens surface 111 (in the middle portion between two opposite longer sides thereof) being located deeper toward inside than portions closer to the longer sides of the oblong lens surface 111. On the other hand, the oblong lens surface 112 which is the surface facing to the back in the optical axis direction (i.e., located at the backside from which a laser beam enters the lens portion 110) is further configured to be a convex surface as viewed in cross section (taken along each plane perpendicular to the longitudinal direction of the lens portion 110) that curves outward with a portion closer to a center in the direction of the width of the oblong lens surface 112 being located farther toward outside than portions closer to the longer sides of the oblong lens surface 112.

As shown in FIG. 2, the rib portions 120 are formed on the both sides of the lens portion 110 facing toward the direction of the widths of the oblong lens surfaces 111, 112, and extend in the longitudinal direction of the lens portion 110. To be more specific, as shown in FIG. 4A, each rib portion 120 is disposed in a position separate from the oblong lens surface 111 (i.e., one of the lens surfaces facing to the front in the optical axis direction) and protrudes outward in the optical axis direction beyond the oblong lens surface 112 (i.e., the other of the lens surfaces facing to the back in the optical axis direction).

Figure 4B:
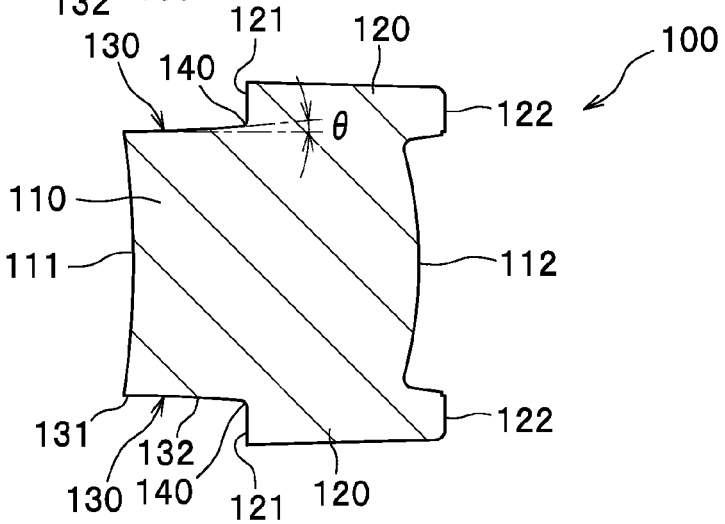
FIG. 4B is a sectional view taken along line III-III of FIG. 3.
Figure 4C:
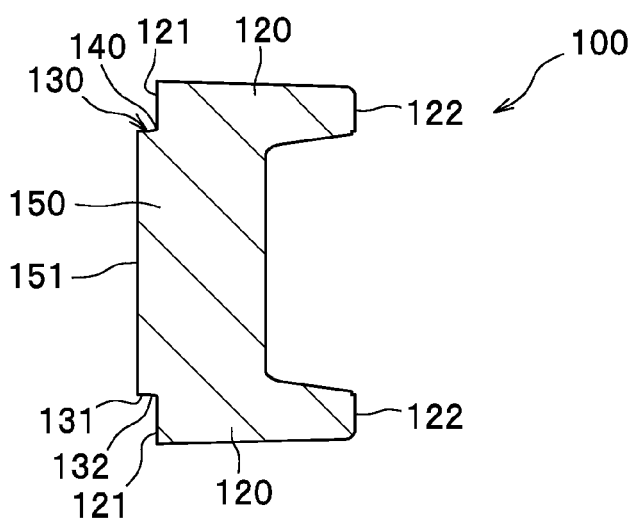
FIG. 4C is a sectional view taken along line IV-IV of FIG. 3.

As shown in FIGS. 4A-4C, each rib portion 120 has opposite sides 121, 122 facing outward in the optical axis direction, which sides 121, 122 are flat surfaces extending in the longitudinal direction of the lens portion 110 (see FIG. 2). A projection 123 protruding from each rib portion 120 outward in the optical axis direction is provided at the center in the direction of the length of its side 122.

The projection 123 is a portion which is engaged with a corresponding recess provided in the housing 50 when the fθ lens 100 is mounted to the optical scanner 5 (e.g., in the housing 50 thereof). With the projection 123 engageable with the recess in the housing 50, the fθ lens 100 can be located in place easily in the housing 50. In view of the present invention, the projection 123 is optional, and may be omitted as the case may be.

The flange portions 150 are portions which are designed to be held by clips (not shown) or the like provided in the housing 50 when the fθ lens 100 is mounted in the optical scanner 5 (to the housing 50). Front sides 151 of the flange portions 150 are formed as flat surfaces extending in a direction perpendicular to the optical axis direction for use in positioning the fθ lens 100.

As shown in FIGS. 4A, 4B and 4C, a draft surface 130 is formed on each side of the lens portion 110, extending in the longitudinal direction of the lens portion 110, between the oblong lens surface 111 and the side 121 of the corresponding rib portion 120. The draft surface 130 includes a flat portion 131 extending from the oblong lens surface 111 halfway toward the rib portion 120 over a predetermined area α, and a slant surface 132 slanting outwardly (in the direction of the width of the oblong lens surface 111) toward the rib portion 120 and extending to a junction with the side 121 of the rib portion 120 over a predetermined area β.

The slant surface 132 is curved inwardly with a draft (degree or angle of taper) thereof increasing gradually toward the rib portion 120. With this configuration, the volume of the fθ lens 100 is smaller than the volume of conventional fθ lenses in which the slant surface of the draft surface is flatly shaped. Accordingly, the time required for injection, cooling, etc. of a molten material during manufacture of the fθ lens 100 can be reduced, and the total manufacturing time can be shortened. Moreover, the mold releasing resistance which is generated when the molded product (fθ lens 100) is removed can be reduced.

Furthermore, the slant surface 132 is configured such that the draft thereof varies gradually along the length thereof as shown in FIGS. 4A, 4B and 4C. To be more specific, the draft θ of a portion closer to the center of the slant surface 132 in the direction of the length (as in FIG. 4A) is greater than the draft θ of a portion closer to the end (shorter side) of the slant surface 132 (as in FIG. 4B). The draft θ of the slant surface 132 in cross sections of FIGS. 4A and 4B are represented as an angle formed between lines TL and LL where TL denotes a line tangent to the curved slant surface 132 at a point near a backside edge in the optical axis direction (i.e., located at a junction where the slant surface 132 joins with a corner portion 140 which will be described later) and LL denotes a line parallel to the direction of withdrawing the molded product from the mold (i.e., coincident with the optical axis direction in this embodiment).

Since the lens portion 110 in this embodiment has its dimension in the optical axis direction gradually reduced toward outward along the length such that the dimension in the optical axis direction of a portion closer to the center of the lens portion 110 in the direction of the length (i.e., along the longer sides of the oblong lens surfaces 111, 112) thereof is greater than the dimension in the optical axis direction of a portion closer to the ends (i.e., the shorter sides of the oblong lens surfaces 111, 112) of the lens portion 110, the ease of its withdrawal from the mold can be maintained even with the aforementioned structural feature in which the draft of the slant surface 132 varies gradually along the length thereof such that the draft of a portion closer to the center of the slant surface 132 in the direction of the length is greater than the draft of portions closer to the both ends (shorter side) of the slant surface 132. The reasoning behind this is as follows. Generally speaking, in cases where the direction of withdrawal of the molded product (i.e., lens 100) coincides with the optical axis direction of the lens, if the draft of a portion of the slant surface closer to the center thereof in the longitudinal direction of the lens portion were designed to approximate 0 degree, that portion of the slant surface which is relatively long in the optical axis direction would have a draft of approximately 0 degree, and thus the mold releasing resistance would disadvantageously become too great. In contrast, even if the draft of a portion of the slant surface 132 closer to the ends of the lens portion 110 is designed to approximate 0 degree as in the present embodiment, the mold releasing resistance will not become so great because the portion of the slant surface 132 which has a draft of approximately 0 degree is short in the optical axis direction. Thus, the enhanced ease of withdrawal of the molded lens product from the mold will be maintained in the present embodiment.

In addition, the configuration of the present embodiment in which the slant surface 132 is designed to have a draft decreasing gradually from the center toward the ends along the length of the slant surface 132 results in the volume reduction, and associated weight reduction, of the fθ lens 100. That is, by providing the slant surface 132 having a draft decreasing gradually from the center toward the ends along the direction of the length in accordance with the present embodiment, the fθ lens 100 which can be manufactured without impairing the enhanced ease of withdrawal and which is lighter in weight is realized.

A curved corner portion 140 is provided at a junction between the slant surface 132 and the side 121 of the rib portion 120 (i.e., the side facing toward the oblong lens surface 111). The corner portion 140 is configured to have a radius of curvature decreasing gradually along the length thereof from the center toward the ends in the direction of the length of the corner portion 140 as shown in FIGS. 4A, 4B and 4C. To be more specific, the radius of curvature of a portion closer to the center of the corner portion 140 in the direction of the length thereof (as in FIG. 4A) is greater than the radius of curvature of a portion closer to the shorter side of the corner portion 140 (as in FIGS. 4B and 4C). With this configuration, the fθ lens 100 is trimmed off at the corner portion 140 wherein an amount of the trimmed volume increases gradually from the center toward the ends of the corner portion 140 along its length. Accordingly, the volume of the fθ lens 100 is reduced more toward the ends of the corner portion 140, and thus a further weight reduction is achieved.

Figure 5A:
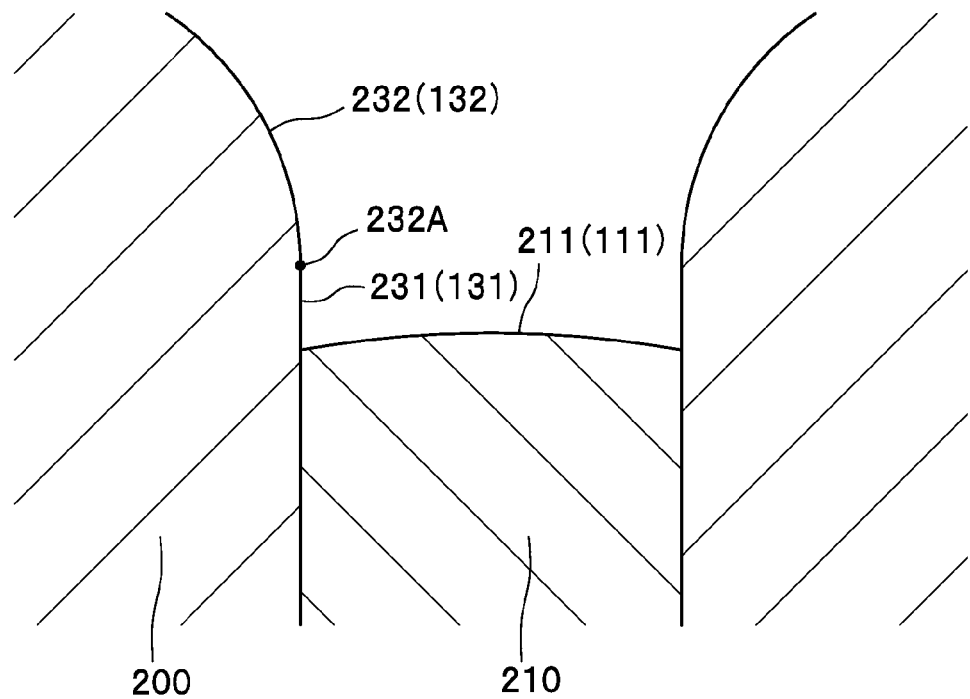
FIG. 5A is a schematic diagram of a mold having a cavity surface contoured to form a flat surface in a draft surface, as illustrated in an exaggerated manner.
Figure 5B:
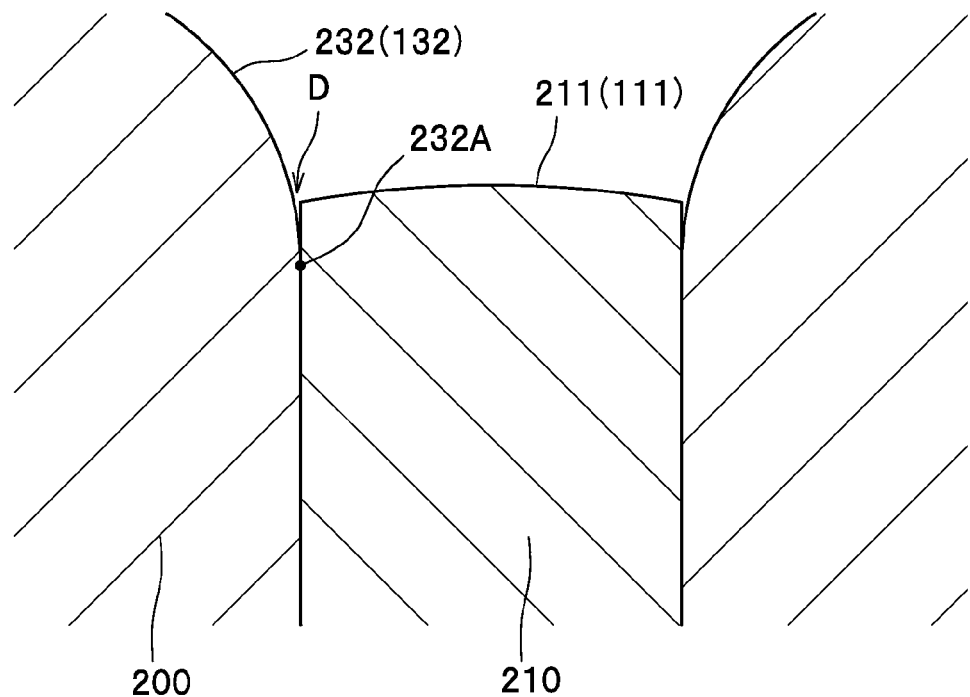
FIG. 5B is a schematic diagram of a mold having no such portion in the cavity surface as contoured to form the flat surface in the draft surface, as illustrated in an exaggerated manner.

The flat portion 131 is configured to be a flatly shaped surface extending parallel to the optical axis direction; thus, the draft of the flat portion 131 is 0 degree. Since a predetermined area α of the draft surface 130 which extends from the oblong lens surface 111 halfway to a position before (short of) the rib portion 120 is configured to have a draft of 0 degree, a mold 200 for forming a portion of the fθ lens 100 other than the oblong lens surface 111 and an insert 210 dedicated to forming the oblong lens surface 111 can be neatly assembled together as shown in FIG. 5A which is illustrated in an exaggerated manner, so that a cavity is formed precisely without interstices D which would appear between the mold 200 and the insert 210 as shown in FIG. 5B which is also illustrated in an exaggerated manner.

To be more specific, the interstices D would possibly develop if the final molded product is designed such that the draft surface consists of an entirely curved and slanted surface (like the slant surface 132) directly connecting to the oblong lens surface and fails to include a flat portion like the flat portion 131 provided in the present embodiment. This is because, according to the configuration shown in FIG. 5B, an edge of a cavity surface 211 (contoured to form a lens surface corresponding to the oblong lens surface 111 of the present embodiment) of the insert 210 would possibly become misaligned from an edge 232A of a curved cavity surface 232 of the mold 200 contoured to form a curved slant surface (corresponding to the slant surface 132 of the present embodiment) of the draft surface due to a dimensional deviation, with the result that interstices D would be left between the edge of the cavity surface 211 and the curved cavity surface 232. In contrast, according to the present embodiment shown in FIG. 5A, such a dimensional deviation can be offset with the help of the cavity surface 231 corresponding to flat surface 131, and thus generation of interstices D can be avoided. Consequently, according to the present embodiment, fins or flashes can be prevented from remaining at the corners between the oblong lens surface 111 and the draft surfaces 130.

The lens 100 configured as described above has several advantageous effects as follow.

Since the slant surface 132 of the draft surface 130 is curved inwardly with a draft thereof increasing gradually toward the rib portion 120, the volume can be reduced, and the manufacturing time can be shortened. Further, the mold releasing resistance which is generated when the molded product (fθ lens 100) is removed can be reduced.

Since the draft of the slant surface 132 varies gradually along the length thereof in such a manner that the draft of a portion closer to the center in the direction of the length of the slant surface 132 is greater than the drafts of portions closer to both ends in the direction of the length of the slant surface 132, the fθ lens 100 can be designed to be lighter in weight while maintaining the ease of withdrawal of the molded product from the mold.

Since the radius of curvature of the corner portion 140 is designed to vary gradually along the length thereof in such a manner that the radius of curvature of a portion closer to the center in the direction of the length of the corner portion 140 is greater than the radii of curvature of portions closer to the both ends in the direction of the length of the corner portion 140, the volume of the corner portion 140 can be decreased gradually from the center to the both ends in the direction of the length of the corner portion 140, and thus further weight reduction of the fθ lens 100 can be achieved.

Since the a predetermined area of the draft surface 130 extending halfway from the oblong lens surface 111 is designed to be the flat surface 131 extending parallel to the optical axis direction, interstices D can be prevented from developing between the mold 200 and the insert 210, so that fins or flashes can be prevented from remaining at the corners between the oblong lens surface 111 and the draft surfaces 130.

Although the illustrative embodiment of the present invention has been described above, the present invention is not limited to the above-described embodiments. Various modifications and changes may be made to the specific structures and arrangement without departing from the scope of the present invention.

In the above-described embodiment, each of the oblong lens surfaces 111, 112 is configured to be a convex surface that curves outward with a portion closer to a center in a direction of a length of the oblong lens surface 111, 112 being located farther toward outside than portions closer to both ends in the direction of the length of the oblong lens surface 111, 112. The present invention is, however, not limited to this specific configuration. The oblong lens surface consistent with the present invention may be configured to a concave surface that curves inward with a portion closer to the center in the direction of the length of the oblong lens surface being located deeper toward inward than portions closer to the both ends in the direction of the length of the oblong lens surface. The configurations of the two oblong lens surfaces may be either symmetric or asymmetric. For example, the two opposite oblong lens surfaces may be configured such that one is a convex surface and the other is a concave surface.

In the above-described embodiment, the fθ lens 100 is described by way of example; however, the type of lens to which the present invention is applicable is not limited to the fθ lens. That is, any type of lens can be designed in accordance with the present invention as long as the lens includes a lens portion having two opposite oblong surfaces. For example, a long-length cylindrical lens may be designed in accordance with the present invention.

The flat surface 131 may have a predetermined draft greater than 0.

In the above-described embodiment, the both of the oblong lens surfaces 111, 112 are designed to be curved lens surfaces each having a refractive power. However, the present invention is not limited to this specific design, and if at least one of the oblong surfaces of the lens has a refractive power, the present invention may be applied advantageously thereto. For example, the oblong surfaces may be configured such that one is a curved lens surface and the other is a flat surface having no refractive power.

The invention claimed is:

1. A lens comprising:
    a lens portion having first and second opposite oblong surfaces, at least one of which is a curved lens surface having a refractive power;
    a rib portion disposed at each of two opposite sides of the lens portion facing in a direction of a width of the first oblong surface, the rib portion extending along a longitudinal direction of the lens portion in a position separate from the second oblong surface; and
    a draft surface extending between the second oblong surface and the rib portion, the draft surface including a slant surface slanting outwardly toward the rib portion, wherein the slant surface of the draft surface is curved inwardly with a draft thereof increasing gradually toward the rib portion.

2. The lens according to claim 1, wherein the second oblong surface is a convex surface that curves outward with a portion closer to a center thereof in the longitudinal direction being located farther toward outside than portions closer to both ends thereof in the longitudinal direction; and
    wherein a draft of the slant surface varies gradually along the longitudinal direction in such a manner that the draft of a portion closer to a center thereof in the longitudinal direction is greater than the drafts of portions closer to both ends thereof in the longitudinal direction.

3. The lens according to claim 1, wherein the rib portion has a side facing toward the second oblong surface, and a curved corner portion is provided at a junction between the draft surface and the side of the rib portion; and wherein a radius of curvature of the corner portion varies gradually along the longitudinal direction in such a manner that the radius of curvature of a portion closer to a center thereof in the longitudinal direction is greater than the radii of curvature of portions closer to both ends thereof in longitudinal direction.

4. The lens according to claim 1, wherein the draft surface further includes a portion of which the draft is 0 degrees and which extends from the second oblong surface halfway to a predetermined position before the rib portion.

* * * * *